United States Patent
Brown et al.

(10) Patent No.: US 10,591,879 B1
(45) Date of Patent: Mar. 17, 2020

(54) HYBRID RULE IMPLEMENTATION FOR AN AUTOMATION SYSTEM

(71) Applicant: Vivint, Inc., Provo, UT (US)

(72) Inventors: Nicholas Brown, Draper, UT (US); Jason Carter, Lehi, UT (US); Ryan Carlson, South Jordan, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/820,092

(22) Filed: Nov. 21, 2017

Related U.S. Application Data

(63) Continuation of application No. 14/481,661, filed on Sep. 9, 2014, now Pat. No. 9,841,740.

(51) Int. Cl.
| | |
|---|---|
| *G05B 15/02* | (2006.01) |
| *H04L 12/28* | (2006.01) |
| *G05B 19/418* | (2006.01) |

(52) U.S. Cl.
CPC ......... *G05B 15/02* (2013.01); *G05B 19/4185* (2013.01); *H04L 12/2814* (2013.01); *H04L 12/2816* (2013.01); *G05B 2219/32136* (2013.01); *Y02P 90/18* (2015.11)

(58) Field of Classification Search
CPC .............. G05B 15/02; G05B 19/4185; G05B 2219/32136; H04L 12/2814; H04L 12/2816; Y02P 90/18
USPC ........................................................ 700/86
See application file for complete search history.

(56) References Cited

U.S. PATENT DOCUMENTS

| | | | |
|---|---|---|---|
| 6,016,499 A | 1/2000 | Ferguson | |
| 6,192,282 B1 | 2/2001 | Smith et al. | |
| 6,263,260 B1 * | 7/2001 | Bodmer | G05D 23/1905 700/275 |
| 6,792,323 B2 * | 9/2004 | Krzyzanowski | H04L 12/2803 700/90 |
| 7,265,866 B2 | 9/2007 | Holmstead et al. | |
| 7,406,473 B1 * | 7/2008 | Brassow | H04L 67/1097 |
| 7,415,310 B2 * | 8/2008 | Bovee | H04L 12/282 700/9 |
| 7,474,426 B2 | 1/2009 | Benz et al. | |
| 8,001,219 B2 | 8/2011 | Moorer et al. | |
| 8,027,937 B1 * | 9/2011 | Bartholomay | H04L 41/5064 706/1 |

(Continued)

FOREIGN PATENT DOCUMENTS

| | | | | |
|---|---|---|---|---|
| CA | 2842816 A1 * | 2/2013 | ........... | A01G 25/167 |
| WO | 2013020140 A1 | 2/2013 | | |
| WO | WO 2013020140 A1 * | 2/2013 | ........... | A01G 25/167 |

*Primary Examiner* — Kenneth M Lo
*Assistant Examiner* — Mohammed Shafayet
(74) *Attorney, Agent, or Firm* — Holland & Hart, LLP

(57) ABSTRACT

According to at least one embodiment, a computer-implemented method to implement at least one automation rule is described. The at least one automation rule may be generated, wherein the at least one automation rule may control at least one aspect of an automation system. The execution origination point may be selected for the at least one automation rule based at least in part on the one or more implementation parameters. The one or more implementation parameters may comprise at least one of the speed of the automation rule execution, the scalability of the automation rule, the flexibility of the automation rule conditions, or the ease of automation rule modification.

19 Claims, 6 Drawing Sheets

(56) References Cited

U.S. PATENT DOCUMENTS

| | | | |
|---|---|---|---|
| 8,260,879 B2* | 9/2012 | Chan | G06F 9/4856 709/217 |
| 8,473,325 B2* | 6/2013 | Barnhill, Jr. | H04L 12/2809 705/7.29 |
| 8,531,276 B2* | 9/2013 | Harris | G08C 17/02 340/12.22 |
| 8,533,144 B1* | 9/2013 | Reeser | G06Q 30/02 705/14.53 |
| 8,537,384 B2 | 9/2013 | Klein et al. | |
| 8,640,038 B1* | 1/2014 | Reeser | G05B 15/02 382/155 |
| 8,806,564 B2* | 8/2014 | Balasubramanian | H04N 5/4401 725/152 |
| 8,817,311 B2 | 8/2014 | Klein et al. | |
| 8,918,341 B2 | 12/2014 | Felix et al. | |
| 9,021,042 B2* | 4/2015 | Weskamp | G06F 9/485 348/143 |
| 9,360,874 B2* | 6/2016 | Imes | G05B 15/02 |
| 2002/0049691 A1* | 4/2002 | Majoor | G06N 5/022 706/47 |
| 2002/0049715 A1* | 4/2002 | Serrano-Morales | G06N 5/022 |
| 2003/0007178 A1 | 1/2003 | Jeyachandran et al. | |
| 2003/0105854 A1* | 6/2003 | Thorsteinsson | G06F 9/542 709/223 |
| 2004/0078258 A1 | 4/2004 | Schulz et al. | |
| 2004/0083448 A1 | 4/2004 | Schulz et al. | |
| 2004/0163073 A1* | 8/2004 | Krzyzanowski | H04L 12/2803 717/107 |
| 2004/0187089 A1 | 9/2004 | Schulz | |
| 2005/0097618 A1* | 5/2005 | Arling | H04L 12/2805 725/114 |
| 2005/0192916 A1* | 9/2005 | Serrano-Morales | G06N 5/022 706/47 |
| 2005/0248806 A1* | 11/2005 | Klein | G06N 5/02 705/310 |
| 2007/0112939 A1* | 5/2007 | Wilson | H04L 12/2807 709/219 |
| 2007/0281664 A1* | 12/2007 | Kaneko | G06F 21/88 455/410 |
| 2008/0235755 A1* | 9/2008 | Blaisdell | H04L 63/0227 726/1 |
| 2009/0204966 A1* | 8/2009 | Johnson | G06F 9/4856 718/100 |
| 2009/0319452 A1* | 12/2009 | Gardner | H04L 29/06 706/12 |
| 2010/0127854 A1* | 5/2010 | Helvick | G08B 25/008 340/539.14 |
| 2010/0138007 A1* | 6/2010 | Clark | H04L 12/2809 700/90 |
| 2010/0161149 A1* | 6/2010 | Nguyen | G06F 1/266 700/296 |
| 2010/0262467 A1* | 10/2010 | Barnhill, Jr. | H04L 12/2809 709/223 |
| 2011/0040391 A1* | 2/2011 | Noecker, Jr. | G05B 15/02 700/19 |
| 2012/0158161 A1* | 6/2012 | Cohn | G08B 29/02 700/90 |
| 2013/0035774 A1 | 2/2013 | Warren et al. | |
| 2013/0275695 A1* | 10/2013 | Ponsford | G06F 11/1448 711/162 |
| 2014/0006569 A1* | 1/2014 | Ferrazzini | H04L 12/2809 709/220 |
| 2014/0006660 A1* | 1/2014 | Frei | H04L 29/1249 710/104 |
| 2014/0025479 A1* | 1/2014 | Carter | G06Q 30/0246 705/14.43 |
| 2014/0101091 A1* | 4/2014 | Brown | G06F 17/30342 707/602 |
| 2014/0143047 A1* | 5/2014 | Carter | G06Q 30/0276 705/14.49 |
| 2014/0172176 A1* | 6/2014 | Deilmann | H04L 12/2827 700/275 |
| 2014/0247135 A1 | 9/2014 | Proud | |
| 2014/0324192 A1* | 10/2014 | Baskaran | G05B 15/02 700/19 |
| 2015/0278305 A1* | 10/2015 | Beilmann | G06F 17/30442 707/718 |
| 2016/0042283 A1* | 2/2016 | Kelly | G08B 13/19 706/12 |
| 2016/0234034 A1* | 8/2016 | Mahar | H04L 12/282 |

* cited by examiner

HYBRID RULE IMPLEMENTATION FOR AN AUTOMATION SYSTEM

CROSS-REFERENCE TO RELATED APPLICATIONS

This application is a continuation of U.S. patent application Ser. No. 14/481,661, filed Sep. 9, 2014, titled "HYBRID RULE IMPLEMENTATION FOR AN AUTOMATION SYSTEM," and assigned to the assignee hereof, the disclosure of which is expressly incorporated herein in its entirety by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Home automation and security products can be fully automated. Automation rules can be created based on different parameters to control aspects of a home or a business.

SUMMARY

According to at least one embodiment, a computer-implemented method to implement at least one automation rule is disclosed. The at least one automation rule may be generated, wherein the at least one automation rule may control at least one aspect of an automation system. The execution origination point may be optimized for the at least one automation rule based at least in part on the one or more implementation parameters. The one or more implementation parameters may comprise at least one of the speed of the automation rule execution, the scalability of the automation rule, the flexibility of the automation rule conditions, or the ease of automation rule modification.

In some embodiments, the at least one automation rule may be stored either on a server associated with an automation system provider or on a control panel associated with the automation system. In some embodiments, an automation rule template may be generated. The automation rule template may be customizable to a specific user or automation system. The automation rule template may be stored on the server associated with the automation system provider. The at least one automation rule may be executed either locally from the control panel or remotely from the server depending at least in part on the optimization. The server may be a cloud server. Automation rules associated with sensor state, security state, device state may be stored on the cloud server.

In some embodiments, an automation rule associated with at least one continuously monitored component may be stored locally on the control panel. A status of the at least one component may be continuously monitored with the control panel. Automation rules associated with home security may be stored locally on the control panel. In some embodiments, the at least one automation rule may be stored on a control panel associated with the automation system and on a server associated with an automation system provider. The at least one automation rule may be executed simultaneously from the control panel and from the server based at least in part on the storing.

According to another embodiment, an apparatus to implement at least one automation rule is also described. The apparatus may include a processor, a memory in electronic communication with the processor and instructions stored on the memory of the processor. The processor may execute the instructions to generate the at least one automation rule wherein the at least one automation rule may control at least one aspect of an automation system. The instructions may optimize an execution origination point for the at least one automation rule based at least in part on the one or more implementation parameters.

According to another embodiment, a non-transitory computer-readable medium that may store instructions executable by a processor is also described. The instructions may generate the at least one automation rule wherein the at least one automation rule may control at least one aspect of an automation system. The instructions may optimize an execution origination point for the at least one automation rule based at least in part on the one or more implementation parameters.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
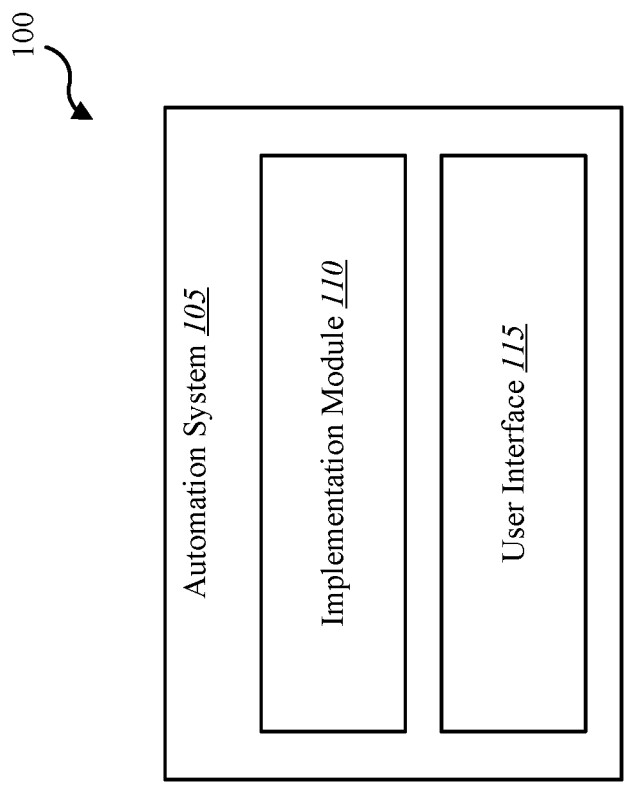
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to implementing automation rules for an automation system. The implementation of automation rules may occur on a system which may utilize one or more servers associated with an automation system to execute automation rules remotely and/or may utilize a control panel to execute automation rules locally. The execution origination point of the automation rules may be based at least in part on one or more implementation parameters.

Automations rules relating to the automation system may be developed and/or set by an administrator. The automation rules may rely on user behavior, habits, preferences or the like. For example, automation rules may be user driven to shut-off all lights in the house at a certain time, turn on outside lighting at a certain time, lock doors when requested, to open and/or shut blinds/drapes, and the like. In other instances, automations rules may be developed from learned behaviors. Automation rules turn on a coffee maker, adjust HVAC settings, adjust lighting, and the like. In further embodiments, automation rules may be conditional. For example, automation rules may adjust an irrigation system based on weather, adjust HVAC settings based on outside temperature, adjust HVAC settings based on user location (proximity to the automation system), and the like. In some embodiments, implementing and/or executing automation rules from the panel may be cumbersome, inefficient, or ineffective.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, an implementation module 110, and a user interface 115.

The implementation module 110 may manage automation rules for an automation system. For example, in some embodiments, automation rules may be updated, modified, and/or improved. Automation rules may be stored locally on the panel, but edits to the automation rules may occur on a server. The server must update the panel with new and/or latest versions of the automaton rules. However, in some embodiments, automation rules may be executed remotely from the server. For example, the server can store the automation rules and, based on various factors, determine when the rule should be executed. The server may communicate the command to the panel, where the panel may take steps to locally implement the automation rule. This may prevent the server from updating the panel every time an automation rule is updated, created, and/or deleted. In some embodiments, the server may be a form of cloud computing.

In some embodiments, the system may be a hybrid system. For example, some automation rules may be stored and executed form the server and some automation rules may be stored and executed from the panel. The location of the automation rules may be based at least in part on the speed of automation rule execution, the scalability of the automation rule, the ease of pairing actions in the system, the flexibility of automation rule conditions, the flexibility of automation rule triggers, the ease of condition modification, template support, connectivity, and the like. For example, in some embodiments, an automation rule may require immediate implementation due to safety and/or security concerns. These automation rules may be stored locally on the panel to avoid latency delays in communication and/or signal relay which may affect the safety and/or security of an automation system and its occupants.

The user interface 115 may allow a user and/or administrator to interact with the automation system 105. A user may comprise any person with access to the automation and security system. A user may comprise an administrator, a family member, an employee, and the like. The user may have varying levels of access and control over the automation and security system. The user interface 115 may facilitate communication between the user and the automation system 105. For example, in some embodiments, the automation system 105 may include a security system.

Figure 2:
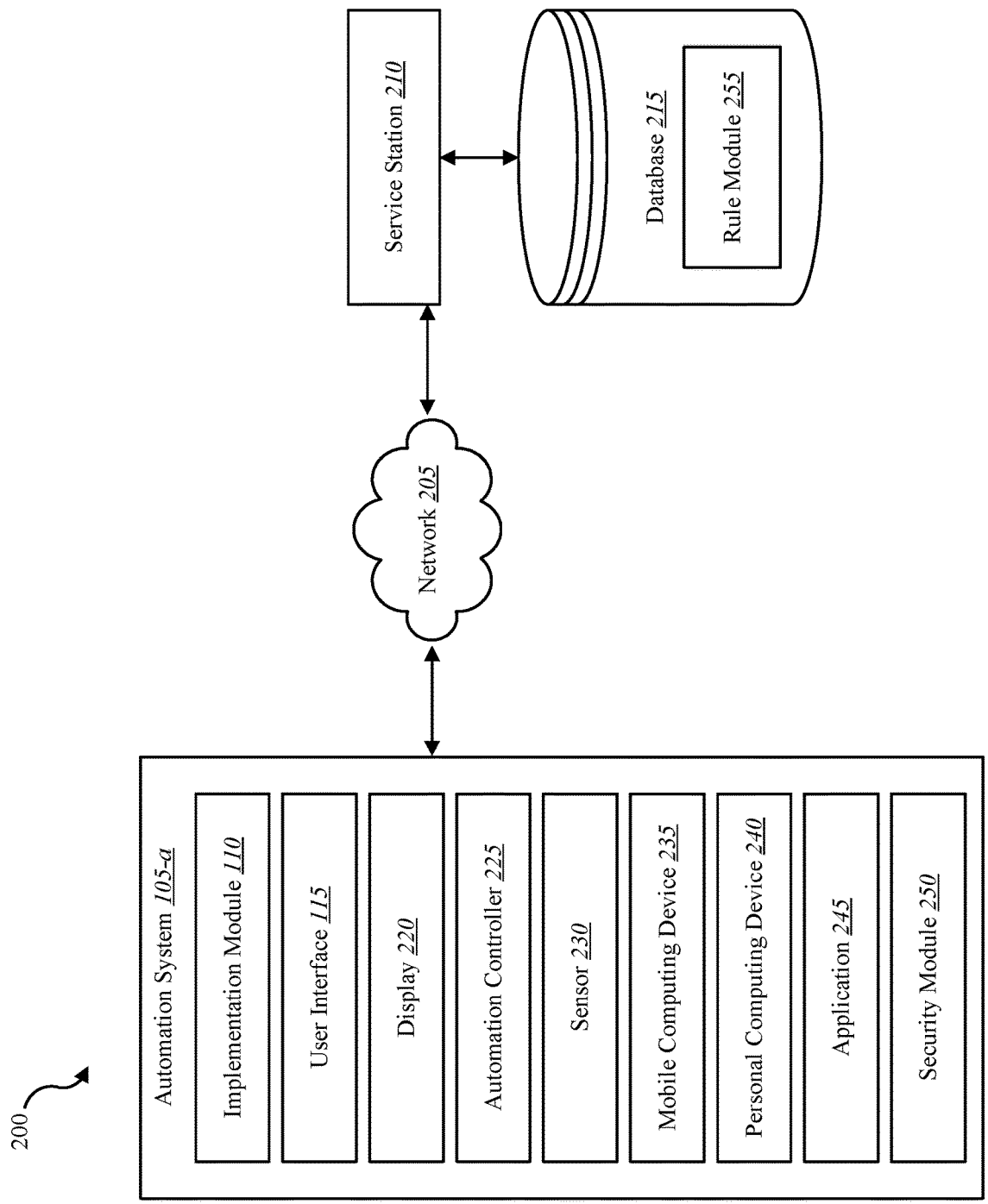
FIG. 2 is a block diagram of another environment in which the present systems and methods may be implemented.

Referring now to FIG. 2, in some embodiments, an environment 200 may include the components of the environment 100 described above, and may further include a network 205, a service station 210, and a database 215. Additionally, the environment 200 may include an automation system 105-a, which may be one example of the automation system 105 described above with reference to FIG. 1. The automation system 105-a may additionally include a display 220, an automation controller 225, a sensor 230, a mobile computing device 235, a personal computing device 240, an application 245, and a security module 250. The automation system 105-a may include various components and functionality that work cooperatively with the implementation module 110 and the user interface 115, and/or may operate independently of the implementation module 110 and the user interface 115.

The sensor 230 shown in FIG. 2 may represent one or more separate sensors or a combination of two or more sensors in a single sensor device. For example, the sensor 230 may represent one or more camera sensors and one or more motion sensors connected to the environment 200. Additionally, or alternatively, the sensor 230 may represent a combination sensor such as both a camera sensor and a motion sensor integrated in the same sensor device. Although the sensor 230 is depicted as connecting directly to the automation system 105-a, in some embodiments, the sensor 230 may connect to the automation system 105-a over network 205.

Additionally, or alternatively, the sensor 230 may be integrated with a home appliance or fixture such as a light bulb fixture. The sensor 230 may include an accelerometer to enable the sensor 230 to detect a movement. The sensor 230 may include a wireless communication device enabling the sensor 230 to send and receive data and/or information to and from one or more devices in the environment 200. Additionally, or alternatively, the sensor 230 may include a GPS sensor to enable tracking a location of the sensor 230. The sensor 230 may include a proximity sensor to enable the sensor 230 to detect a proximity of a person relative to a predetermined distance from a dwelling (e.g., geo-fencing). The sensor 230 may include one or more security detection sensors such as, for example, a glass break sensor, a motion detection sensor, or both. Additionally, or alternatively, the sensor 230 may include a smoke detection sensor, a carbon monoxide sensor, or both. The sensor 230 may include one or more olfactory sensors. In some instances, the sensor 230 may include one or more load sensors which may detect a load or weight applied to the sensor.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to the automation system 105-a, in some embodiments, the mobile computing device 235 may connect to the automation system 105-a over the network 205. Additionally, the mobile computing device 235 may represent a single mobile computing device or multiple mobile computing devices that may access the automation system 105-a.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), mobile computing devices, computers, servers, etc. Although the personal computing device 240 is depicted as connecting directly to the automation system 105-a, in some embodiments, the personal computing device 240 may connect to the automation system 105-a over the network 205. Additionally, the personal computing device 240 may represent a single mobile computing device or multiple mobile computing devices that may access the automation system 105-a.

In some embodiments, a user may access the functions of automation system 105-a from either the mobile computing device 235 or the personal computing device 240. For example, in some embodiments, the user may have a user profile associated with the automation system 105-a and may access the system via the mobile computing device 235 or the personal computing device 240. The user may access the automation system 105-a using their personal computing device 240 and/or mobile computing device 235 without a user profile associated with the automation system 105-a. In some embodiments, the mobile computing device 235 and/or the personal computing device 240 may include a mobile application interfacing with one or more functions of the automation system 105-a, and the service station 210.

Examples of the automation controller 225 may include a dedicated automation computing device. Examples of a dedicated computing device may include a wall-mounted controller, a remote control, a voice activated controller, and the like. In some embodiments, the automation controller 225 may control aspects of a property as well as receive and display notifications regarding monitored activity of a property.

In some embodiments, the application 245 may allow a user to control (either directly or via automation controller 225) an aspect of the monitored property based on the user accessibility permissions, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-a to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-a and the service station 210.

In some embodiments, the automation system 105-a may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider. In some embodiments, the service station 210 may perform various and/or all aspects of the implementation module 110.

In some embodiments, the service station 210 may be coupled to the database 215. The database 215 may include, for example, at least one automation rule associated with the automation system 105-a. For example, the database 215 may include a rule module 255 which may store one or more rules associated with the automation system 105-a. In some embodiments, the rule module 255 may periodically update the at least one automation rule. The database 215 may include other information including, for example, historical information about the automation system 105-a, other aspects of environment 200, and the like.

Figure 3:
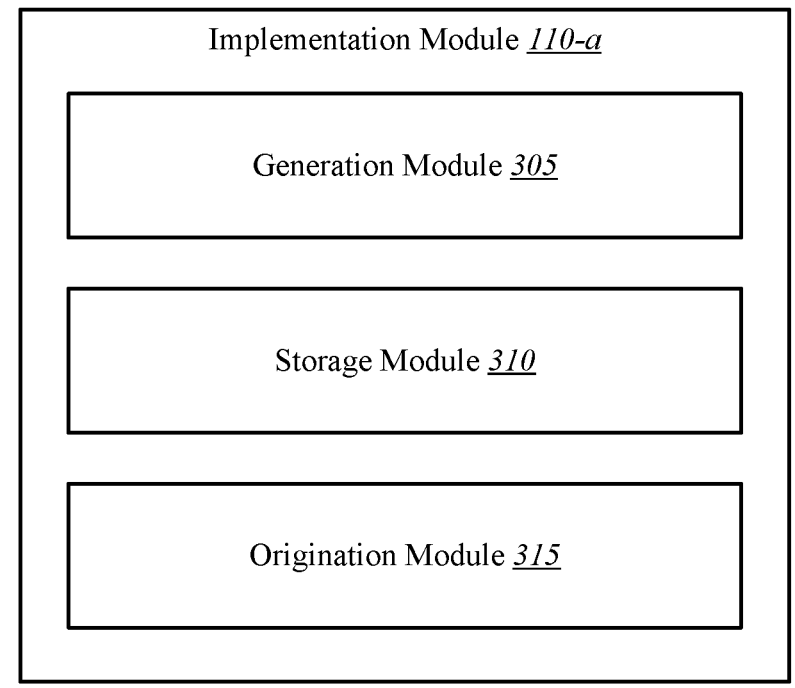
FIG. 3 is a block diagram of an example implementation module of the environments shown in FIGS. 1 and 2.

FIG. 3 is a block diagram 300 illustrating one example of an implementation module 110-a. The implementation module 110-a may be one example of the implementation module 110 depicted in FIGS. 1 and/or 2. As depicted, the implementation module 110-a may include a generation module 305, a storage module 310, and an origination module 315. The implementation module 110-a may include additional modules and capabilities in other embodiments. Similarly, the implementation module 110-a may include fewer number of modules and functionality than that which is described with reference to FIG. 3. The implementation module 110-a may optimize the implementation of at least one rule for an automation system.

In some embodiments, the generation module 305 may generate one or more automation rules associated with an automation system. Automation rules may rely on user behavior, habits, preferences or the like. For example, the generation module 305 may create rules based at least in part on user mannerisms. The generation module 305 may track when a user shuts-off all lights in the house, turns on outside lighting at a certain time, locks the doors, adjusts the blinds/drapes, and the like. In other instances, the generation module 305 may develop automation rules from learned behaviors. For example, the generation module 305 may create automation rules to turn on a coffee maker, adjust HVAC settings, adjust lighting, and the like. In further embodiments, the generation module 305 may create conditional automation rules. For example, the generation module 305 may create automation rules that may adjust an irrigation system based on weather, adjust HVAC settings based on outside temperature, adjust HVAC settings based on user location, and the like.

In some embodiments, the generation module 305 may create automation rules relating to a continuous state of at least one sensor or component of the automation system. For example, the automation system may continuously monitor a status of a sensor and automation rules may execute based at least in part on an immediate status change or as a function of time. In further embodiments, automation rules may relate to geo-tracking or weather.

In some embodiments, the generation module 305 may generate one or more automation rules from one or more templates. For example, one or more templates may be stored within the generation module 305. The generation module 305 may modify, adjust, adapt, or otherwise use a rule template to customize the automation rule to a particular automation system. In some embodiments, the templates may be customized to a specific location, type of business, home, or user. For example, the generation module 305 may generate and adapt a template for specific users and/or automation systems.

In some embodiments, the generation module 305 may update, modify, improve, and/or delete automation rules. For example, the generation module 305 may change existing automation rules based on one or more parameters. The parameters may comprise a user request, a change in users, a change in habit, a change in location, a change in seasons, or the like. For example, a user may request a change to an automation rule. In some embodiments, the generation module 305 may automatically update one or more automation rules based on the seasons. For example, external lighting activation times may change based on time of year. Additionally, irrigation systems need not be used in cold weather clients during winter months. In some embodiments, adding a user may adjust the habits or mannerisms of the overall automation system. For example, the user may wake up earlier, stay up later, like a hotter temperature in their bedroom, and the like.

The storage module 310 may store or determine where to store at least one automation rule relating to an automation system. For example, all rules relating to the automation system may be stored remotely from the automation system on a server. The server may be a cloud server. In addition, some rules may be stored locally on the control panel. In some instances, some and/or all automation rules may be stored both locally on the control panel or other storage device and remotely on a server. The storage module 310 may determine where to store each rule based at least in part on one or more parameters.

The storage parameters may include at least one of sensor state, security state, and device state. Sensor state may relate to changes in a sensor, an ongoing status of the sensor, or the like. Security state may relate to armed status of the automation system and any potential triggers. For example, security state may be a matter of the automation system being armed or unarmed, or may relate to triggering one or more security-related sensors. Device state may be one of a status of an object within the automation system. For example, device state may relate to an irrigation system, HVAC system, appliance, light fixture, and the like. In some embodiments, automation rules based at least in part on one or more storage parameters may be stored locally on the control panel or on a remote server. The remote server may be a cloud server.

In some embodiments, the storage module 310 may store one or more rules locally on a control panel or other interface associated with the automation system. In some embodiments, one or more factors may influence which automation rules are locally stored. For example, in some instances, components in the automation system are continuously monitored. For example, the automation system may continuously determine the status of a door, i.e. if the door is open, closed, etc. In these embodiments, it may be more effective to store automation rules relating to continuously monitored components on a local hard-drive for safety and efficiency concerns. For example, it may be ineffective to continuously report a status of a component to a server. It may result in increased server traffic which may, in turn, slow down server response time for other components or automation rules. Additionally, if the sensor relates to a safety concern, storing the automation rule locally may prevent any latency from delaying the execution of a rule. For example, if the automation system has the ability to close a door, or send an alarm to a local safety agency, any latency may prevent the timely execution of such an automation rule. Therefore, for speed and efficiency, the automation rule may be stored locally on a storage device and/or control panel associated with the automation system.

The origination module 315 may determine where and when to execute one or more automation rules. For example, as discussed previously, automation rules may be stored either on a remote server and/or locally on a storage device. The origination module 315 may determine which storage point to use as an origination for executing at least one automation rule. The execution origination point may be optimized based at least in part on one or more implementation parameters. The implementation parameters may comprise at least one of speed of the automation rule execution, the scalability of the automation rule, the flexibility of the automation rule conditions, the ease of automation rule modification, and the like.

The speed of the automation rule execution may be in relation to safety concerns or the like. For example, in some embodiments, it may be beneficial to have automation rules executed locally from a control panel or other storage device at the automation system to reduce latency or connectivity delays. The scalability of the automation rule is also a factor in execution origination. For example, in some embodiments, the amount of server capacity to perform and/or effect the automation rule may be flexible. Using a remote server, and in some embodiments, a cloud server, may allow the origination module 315 to easily scale and use adequate capacity to perform the automation rule.

The flexibility of the automation rule conditions may also be an origination factor. For example, in some embodiments, some automation rules may not require precise or immediate execution. For example, automation rules relating to non-security or non-critical functions such as HVAC systems, lighting, irrigation, and the like. In these embodiments, storing and executing these automation rules from the server may be more efficient and cost effective because it does not utilize the resources of the control panel and/or dictate the size and functionality of the control panel.

In some embodiments, the origination module 315 may execute at least one automation rule from the control panel as well as from the server. For example, in some embodiments, automation rules may be stored both locally and remotely. In some embodiments, it may be pertinent to execute a rule from both locations to ensure its implementation. For example, a control panel and/or server may have unknown difficulties in implementing the rule. The control panel and/or server may be experiencing unknown technical difficulties and triggering the implementation of an automation rule from both locations may ensure the rule is actually implemented despite any difficulties. Additionally, the control panel may be destroyed from an intruder or other physical damage such as a fire, water damage and the like. Again, dually implementing the automation rule from the control panel and the server may ensure the rule is implemented.

Figure 4:
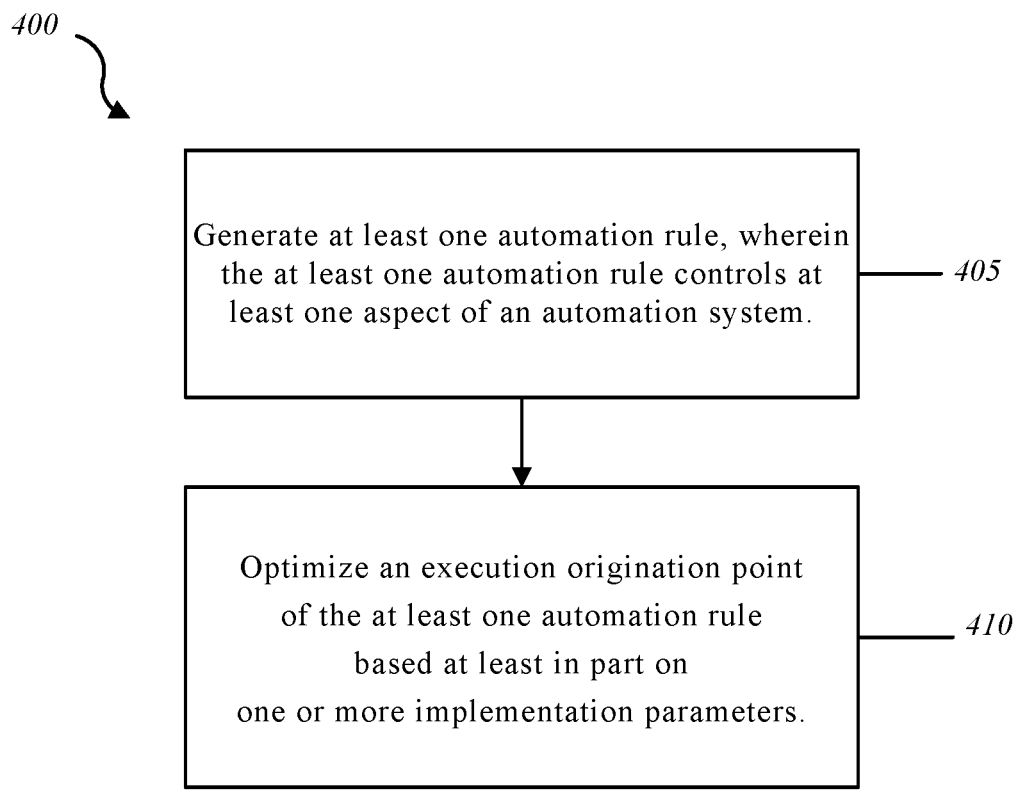
FIG. 4 is a flow diagram illustrating an exemplary method for implementing automation rules.

FIG. 4 is a flow diagram illustrating one embodiment of a method 400 for implementing an automation rule. In some configurations, the method 400 may be implemented in whole or in part by the implementation module 110 of the automation system 105 shown in FIGS. 1 and/or 2. In further embodiments, the method 400 may be performed generally by the automation system 105 shown in FIGS. 1 and/or 2, or even more generally by the environments 100, 200 shown in FIGS. 1 and/or 2.

At block 405, at least one automation rule may be generated, wherein the at least one automation rule may control at least one aspect of an automation system. For example, a generation module (e.g. generation module 305) may generate one or more automation rules. In some embodiments, the automation rule may be generated using one or more templates. The automation rules may rely on user behavior, habits, preferences or the like. For example, automation rules may be user driven to shut-off all lights in the house at a certain time, turn on outside lighting at a certain time, lock doors when requested, to open and/or shut blinds/drapes, and the like. In other instances, automations rules may be developed from learned behaviors. For example, automation rules turn on a coffee maker, adjust HVAC settings, adjust lighting, and the like. In further embodiments, the automation rules may be conditional. For example, automation rules may adjust an irrigation system based on weather, adjust HVAC settings based on outside temperature, adjust HVAC settings based on user location, and the like.

At block 410, an execution origination point of the at least one automation rule may be optimized based at least in part on one or more implementation parameters. In some embodiments, automation rules may be stored on a server associated with the automation system and/or locally on a control panel or other storage system. The execution origination point of the at least one automation rule may be based at least in part on the speed of automation rule execution, the scalability of the automation rule, the ease of pairing actions in the system, the flexibility of automation rule conditions, the flexibility of automation rule triggers, the ease of condition modification, template support, connectivity, and the like. In some embodiments, an automation rule may require immediate implementation. For example, the automation rule may relate safety and/or security. Safety and/or security automation rules may be executed locally on the panel to avoid latency delays in communication and/or signal relay which may affect the safety and/or security of an automation system and its occupants.

In further embodiments, automation rules relating to a continuous state of at least one sensor or component of the automation system may be stored and executed locally on the panel. For example, the panel may continuously monitor the state of at least one sensor but need not communicate the continuous sensor state to a server. In those embodiments, locally storing the continuous state automation rule on the panel may reduce server load.

Figure 5:
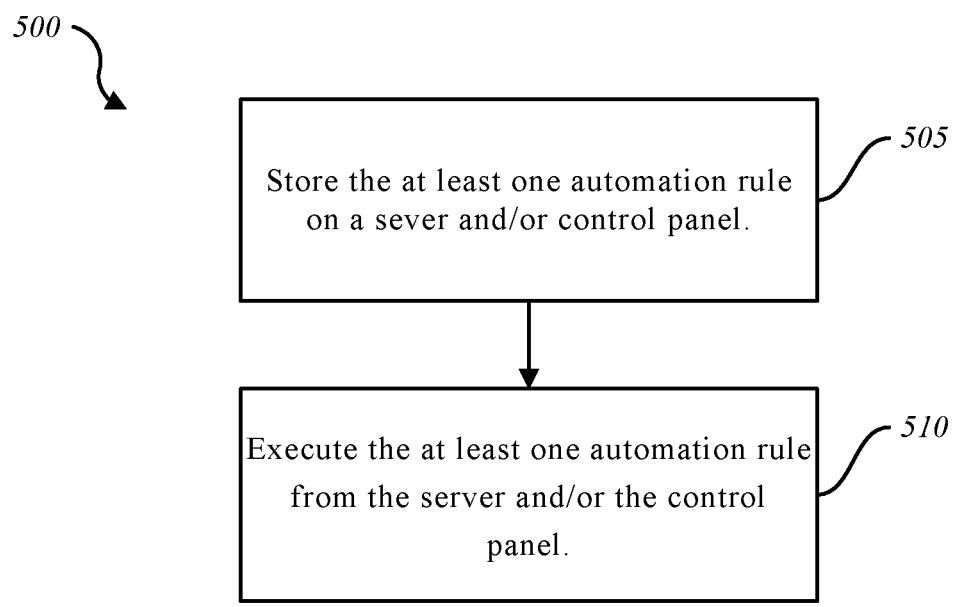
FIG. 5 is another flow diagram illustrating another exemplary method implementing automation rules.

FIG. 5 is a flow diagram illustrating one embodiment of a method 500 for implementing an automation rule. In some configurations, the method 500 may be implemented in whole or in part by the implementation module 110 of the automation system 105 shown in FIGS. 1 and 2. In further configurations, the method 500 may be performed generally by the automation system 105 shown in FIGS. 1 and/or 2, or even more generally by the environments 100, 200 shown in FIGS. 1 and/or 2.

At block 505, the at least one automation rule may be stored on a server, control panel, or both. The server may be a cloud server. Automation rules relating to a continuous state of at least one sensor or component of the automation system may be stored and executed locally on the panel. For example, the panel may continuously monitor the state of at least one sensor but need not communicate the continuous sensor state to a server. In those embodiments, it may be more efficient to locally store the continuous state automation rule locally on the panel to reduce server load. For example, updating a server on the continuous state of at least one component may result in a large server load.

In other instances, automation rules stored on the server may be more efficient. For example, automation rules relating to geo-tracking or weather may be better managed form a central location. The automation rules may apply to more than one automation system in a given region. The server may collectively track the appropriate environmental concerns for a group of automation systems and execute automation rules collectively based on environmental factors. In other embodiments, tracking a location of a user may be more efficient from a server. By utilizing both a remote server and the panel to execute automation rules, the automation system may run more efficiently and effectively.

In some embodiments, automation rules may be updated, modified, and/or improved. When automation rules are stored locally on the panel, edits to the automation rules may occur on the server. The server must then update the panel with new and/or latest versions of the automaton rules. However, the automation rules may be executed remotely from the server. For example, the server can store the automation rules and, based on various factors, determine when the rule should be executed. The server can communicate the command to the panel, where the panel may take steps to locally implement the automation rule. This prevents the server from having to communicate and/or update the panel every time an automation rule is updated.

At block 510, the at least one automation rule may be executed from either the server or the control or both. For example, one or more implementation parameters and/or a storage location may determine how the automation rule is implemented. One or more implementation parameters may comprise sensor state, security state, device state, and the like. In some embodiments, home security automation rules may always be executed locally from the panel, and, in some embodiments, may additionally be implemented remotely from a server to ensure implementation.

Figure 6:
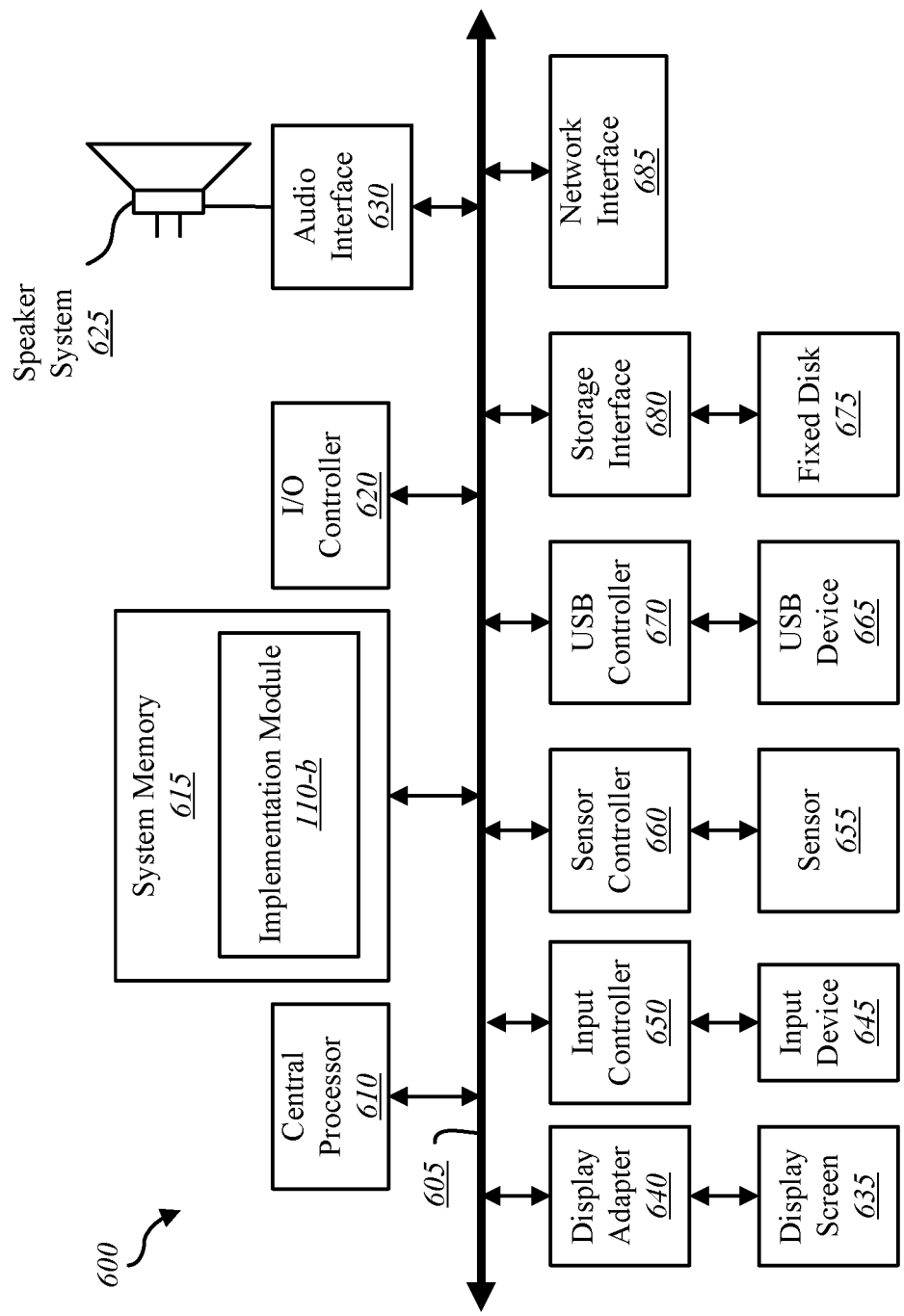
FIG. 6 is a block diagram of a computer system suitable for implementing the present systems and methods of FIGS. 1-5.

FIG. 6 depicts a block diagram of a controller 600 suitable for implementing the present systems and methods. The controller 600 may be an example of the automation controller 225, the personal computing device 240, and/or the mobile computing device 235 illustrated in FIG. 2. In one configuration, the controller 600 may include a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, a implementation module 110-b to implement the present systems and methods may be stored within the system memory 615. The implementation module 110-b may be an example of the implementation module 110 illustrated in FIGS. 1, 2, and/or 3. Applications (e.g., application 245) resident with controller 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via the network interface 685.

Storage interface 680, as with the other storage interfaces of controller 600, can connect to a standard computer readable medium for storage and/or retrieval of information, such as a fixed disk drive 675. The fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to implement at least one automation rule, comprising:
    generating an automation rule template, wherein the template is customizable to a specific user or automation system;
    generating the at least one automation rule based at least in part on the template, wherein the at least one automation rule controls at least one aspect of the automation system;
    selecting a first location having a first storage device and a second location having a second storage device for the at least one automation rule based at least in part on one or more implementation parameters, the one or more implementation parameters including a security state, wherein the security state is based at least in part on a state of one or more security-related sensors;
    storing the at least one automation rule at the first location and the second location; and
    executing the at least one automation rule simultaneously at the first location and the second location based at least in part on the one or more implementation parameters including the security state, wherein the security state is based at least in part on the state of one or more security-related sensors.

2. The computer-implemented method of claim 1, wherein the one or more implementation parameters further comprises at least one of a speed of the automation rule execution, a scalability of the at least one automation rule, a flexibility of automation rule conditions, or an ease of automation rule modification.

3. The computer-implemented method of claim 1, wherein the first storage device is a server associated with an automation system provider.

4. The computer-implemented method of claim 1, wherein the second storage device is a control panel associated with the automation system.

5. The computer-implemented method of claim 3, wherein the server is a cloud server.

6. The computer-implemented method of claim 5, wherein automation rules associated with a sensor state, the security state, and a device state are stored on the cloud server.

7. The computer-implemented method of claim 4, wherein the automation rule is associated with at least one continuously monitored component, the method further comprising:
    continuously monitoring a status of the at least one component with the control panel.

8. The computer-implemented method of claim 1, further comprising:
    detecting a security-related sensor trigger, determining an armed or unarmed status of the automation system, or both, wherein the state of the one or more security-related sensors is based at least in part on the detecting, the determining, or both.

9. An apparatus to implement at least one automation rule, comprising:
    a processor;
    a memory in electronic communication with the processor; and
    instructions stored in the memory, the instructions being executable by the processor to:
    generate an automation rule template, wherein the template is customizable to a specific user or automation system;
    generate at least one automation rule based at least in part on the template, wherein the at least one automation rule controls at least one aspect of the automation system;
    select a first location having a first storage device and a second location having a second storage device for the at least one automation rule based at least in part on one or more implementation parameters, the one or more implementation parameters including a security state, wherein the security state is based at least in part on the state of one or more security-related sensors;
    store the at least one automation rule at the first location and the second location; and
    execute the at least one automation rule simultaneously from the first location and the second location based at least in part on the one or more implementation parameters including the security state, wherein the security state is based at least in part on the state of one or more security-related sensors.

10. The apparatus of claim 9, wherein the one or more implementation parameters further comprises at least one of a speed of the automation rule execution, a scalability of the at least one automation rule, a flexibility of automation rule conditions, or an ease of automation rule modification.

11. The apparatus of claim 9, wherein the first storage device is a server with an automation system provider and the second storage device is a control panel associated with the automation system.

12. The apparatus of claim 11, wherein the instructions are executable by the processor to:
    store the automation rule template on the server associated with the automation system provider.

13. The apparatus of claim 9, wherein the instructions are executable by the processor to:
    detect a security-related sensor trigger, determine an armed or unarmed status of the automation system, or both, wherein the state of the one or more security-related sensors is based at least in part on the detecting, the determining, or both.

14. A non-transitory computer-readable medium storing instructions executable by a processor to:
    generate an automation rule template, wherein the template is customizable to a specific user or automation system;
    generate at least one automation rule based at least in part on the template, wherein the at least one automation rule controls at least one aspect of the automation system; and
    select a first location having a first storage device and a second location having a second storage device for the at least one automation rule based at least in part on one or more implementation parameters, the one or more implementation parameters including a security state, wherein the security state is based at least in part on the state of one or more security-related sensors;

store the at least one automation rule at the first location and the second location; and execute the at least one automation rule simultaneously from the first location and the second location based at least in part on the one or more implementation parameters including the security state, wherein the security state is based at least in part on the state of one or more security-related sensors.

15. The computer-readable medium of claim 14, wherein the one or more implementation parameters further comprises at least one of a speed of the automation rule execution, a scalability of the at least one automation rule, a flexibility of automation rule conditions, or an ease of automation rule modification.

16. The computer-readable medium of claim 14, wherein the first location comprises a server associated with an automation system provider and wherein the second location comprises a control panel associated with the automation system.

17. The computer-readable medium of claim 16, wherein the automation rule is associated with at least one continuously monitored component, and wherein the instructions are executable by the processor to:

continuously monitor a status of the at least one component with the control panel.

18. The computer-readable medium of claim 16, wherein the server is a cloud server.

19. The computer-readable medium of claim 14, wherein the instructions are further executable by the processor to:

detect a security-related sensor trigger, determine an armed or unarmed status of the automation system, or both, wherein the state of the one or more security-related sensors is based at least in part on the detecting, the determining, or both.

* * * * *